(12) United States Patent
Ishikura

(10) Patent No.: US 12,308,743 B2
(45) Date of Patent: May 20, 2025

(54) SINGLE INDUCTOR CONVERTER WITH CURRENT LOOPS IN OPPOSITE DIRECTIONS

(71) Applicant: Murata Manufacturing Co., Ltd., Nagaokakyo (JP)

(72) Inventor: Yuki Ishikura, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 278 days.

(21) Appl. No.: 18/134,599

(22) Filed: Apr. 14, 2023

(65) Prior Publication Data

US 2023/0402922 A1  Dec. 14, 2023

(30) Foreign Application Priority Data

Jun. 10, 2022  (JP) .................................. 2022-094320

(51) Int. Cl.
*H02M 3/158* (2006.01)
*H02M 3/00* (2006.01)

(52) U.S. Cl.
CPC ........... *H02M 3/158* (2013.01); *H02M 3/003* (2021.05); *H02M 3/1584* (2013.01)

(58) Field of Classification Search
CPC .............................. H02M 3/003; H02M 3/158
See application file for complete search history.

(56) References Cited

U.S. PATENT DOCUMENTS

| 7,285,941 B2 * | 10/2007 | Cha ...................... H02M 3/1584 323/272 |
| 7,741,822 B2 * | 6/2010 | Chen ................... H02M 3/1584 323/283 |
| 2011/0181255 A1 * | 7/2011 | Hashimoto ......... H02M 3/1588 323/272 |

FOREIGN PATENT DOCUMENTS

JP            2011-152011 A        8/2011

OTHER PUBLICATIONS

M. Ilic and D. Maksimovic, "Interleaved Zero-Current-Transition Buck Converter," in IEEE Transactions on Industry Applications, vol. 43, No. 6, pp. 1619-1627, Nov.-Dec. 2007 (Year: 2007).*

* cited by examiner

Primary Examiner — Peter M Novak
(74) Attorney, Agent, or Firm — Keating & Bennett, LLP

(57) ABSTRACT

In a power converter, a first current loop includes a first snubber capacitor, a first high-side switch, and a first low-side switch, and a second current loop includes a second snubber capacitor, a second high-side switch, and a second low-side switch. In a plan view in a direction perpendicular or substantially perpendicular to a substrate, third low-potential wiring defining a portion of the second power line is located between the first current loop and the second current loop. A direction of current flowing through the first current loop is opposite to a direction of current flowing through the second current loop.

20 Claims, 4 Drawing Sheets

SINGLE INDUCTOR CONVERTER WITH CURRENT LOOPS IN OPPOSITE DIRECTIONS

CROSS REFERENCE TO RELATED APPLICATIONS

This application claims the benefit of priority to Japanese Patent Application No. 2022-094320 filed on Jun. 10, 2022. The entire contents of this application are hereby incorporated herein by reference.

BACKGROUND OF THE INVENTION

1. Field of the Invention

The present invention relates to a power converter.

2. Description of the Related Art

Japanese Unexamined Patent Application Publication No. 2011-152011 discloses a power converter. The power converter includes an input capacitor and four power MOSFETs. The input capacitor is connected to the positive electrode and the negative electrode of a direct-current (DC) input power supply. Two of the four power MOSFETs are connected in series between both electrodes of the DC input electrode. The remaining two of the four power MOSFETs are connected in series between both electrodes of the DC input electrode. The two pairs of the power MOSFETs connected in series are parallel to each other.

SUMMARY OF THE INVENTION

In the power converter as described in Japanese Unexamined Patent Application Publication No. 2011-152011, a current path, that is, what is called a current loop is present, the current path being from the first end of the input capacitor to the second end of the input capacitor via the power MOSFETs on the high side and the power MOSFETs on the low side. In such a current loop, parasitic inductance is generated. In addition, the parasitic inductance of the current loop including the two of the four power MOSFETs is different from the parasitic inductance of the current loop including the remaining two of the power MOSFETs on occasions. The generation of the difference between the parasitic inductances causes an increase in noise of the current converter in some cases.

Accordingly, a preferred embodiment of the present invention provides a power converter including a substrate, a first power line, a second power line with an electrical potential lower than an electrical potential of the first power line, a first high-side switch including a first terminal connected to the first power line, a first low-side switch including a first terminal connected to a second terminal of the first high-side switch and a second terminal connected to the second power line, a first capacitor including a first end connected to the first terminal of the first high-side switch and a second end connected to the second power line, a second high-side switch that includes a first terminal connected to the first power line and that is parallel or substantially parallel to the first high-side switch, a second low-side switch including a first terminal connected to a second terminal of the second high-side switch and a second terminal connected to the second power line, a second capacitor including a first end connected to the first terminal of the second high-side switch and a second end connected to the second power line, an inductor including a first end connected to the second terminal of the first high-side switch and the second terminal of the second high-side switch, an output capacitor including a first end connected to a second end of the inductor and a second end connected to the second power line, a first current loop including the first capacitor, the first high-side switch, and the first low-side switch, and a second current loop including the second capacitor, the second high-side switch, and the second low-side switch. The first power line, the second power line, the first high-side switch, the first low-side switch, the first capacitor, the second high-side switch, the second low-side switch, the second capacitor, the inductor, and the output capacitor are provided on the substrate. In a plan view in a direction perpendicular or substantially perpendicular to a main surface of the substrate, the first power line or the second power line is located between the first current loop and the second current loop, and a direction of current flowing through the first current loop is opposite to a direction of current flowing through the second current loop.

According to the configuration above, the elements of the first current loop are separated from the elements of the second current loop by the first power line or the second power line, the first power line and the second power line having a stable electric potential. The first current loop and the second current loop are thus provided as independent loops. The directions of the current flowing through the two current loops are opposite to each other. Accordingly, noise generated by the current flow to the switches in the first current loop and noise generated by the current flow to the switches in the second current loop are mutually cancelled. As the result, the noise may thus be reduced in the power converter as a whole.

According to the power converter of the present disclosure, noise caused by parasitic inductance may be reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Hereinafter, a first preferred embodiment of a power converter will be described. Note that components are enlarged for easier understanding in some drawings. The ratios of the dimensions of the components are different from the actual ratios of the dimensions or in the components in a different drawing on occasions.

Circuit Configuration of Power Converter

First, the circuit configuration of a power converter 10 will be described.

Figure 1:
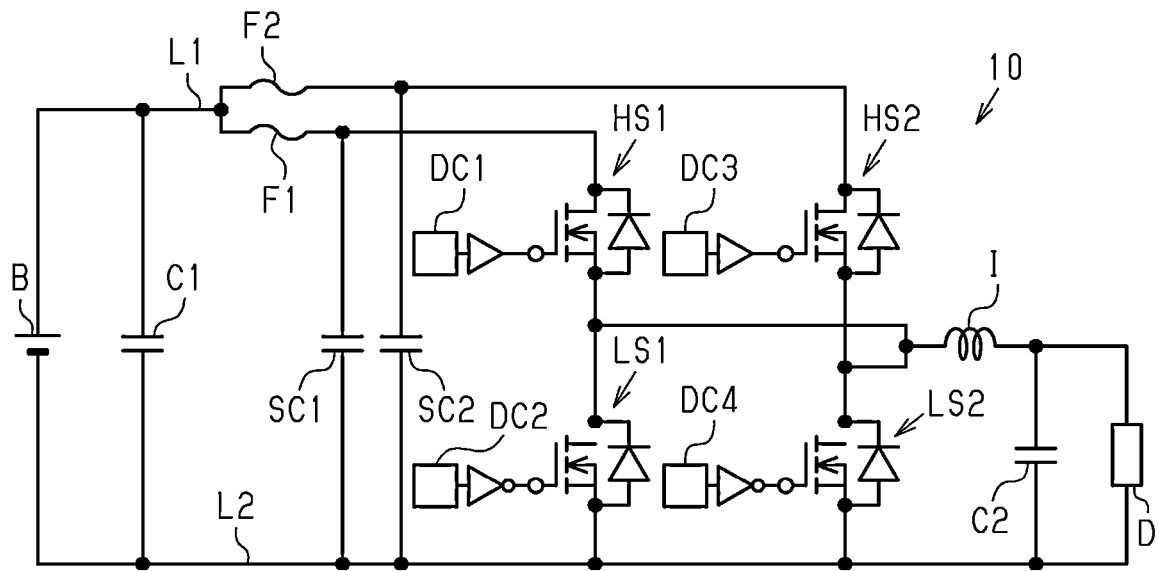
FIG. 1 is a circuit diagram of a power converter of a first preferred embodiment the present invention.

As illustrated in FIG. 1, the power converter 10 includes a first power line L1, a second power line L2, and an input capacitor C1. The first power line L1 is connected to the positive electrode terminal of a DC power supply B. The second power line L2 is connected to the negative electrode terminal of the DC power supply B. Note that the second power line L2 is grounded; however, the illustration thereof is omitted. The second power line L2 thus has a ground potential lower than the electrical potential of the first power line L1. A first end of the input capacitor C1 is connected to the first power line L1. A second end of the input capacitor C1 is connected to the second power line L2.

The power converter 10 includes a first high-side switch HS1, a first low-side switch LS1, a second high-side switch HS2, and a second low-side switch LS2. These switches are each an N-type metal oxide silicon field effect transistor (MOSFET). The power converter 10 also includes a first fuse F1 and a second fuse F2. Note that the drain terminal of each switch is a first terminal. The source terminal of the switch is a second terminal. The gate terminal of the switch is a third terminal.

The drain terminal of the first high-side switch HS1 is connected to the first power line L1 with the first fuse F1 interposed therebetween. The first fuse F1 fuses when current having a specific value or higher flows. The drain terminal of the first low-side switch LS1 is connected to the source terminal of the first high-side switch HS1. The source terminal of the first low-side switch LS1 is connected to the second power line L2.

The drain terminal of the second high-side switch HS2 is connected to the first power line L1 with the second fuse F2 interposed therebetween. The second fuse F2 fuses when current having a specific value or higher flows. The second high-side switch HS2 is parallel or substantially parallel to the first high-side switch HS1. The drain terminal of the second low-side switch LS2 is connected to the source terminal of the second high-side switch HS2. The source terminal of the second low-side switch LS2 is connected to the second power line L2.

The power converter 10 includes a first snubber capacitor SC1 as a first capacitor and a second snubber capacitor SC2 as a second capacitor. A first end of the first snubber capacitor SC1 is connected to the drain terminal of the first high-side switch HS1. A second end of the first snubber capacitor SC1 is connected to the second power line L2. A first end of the second snubber capacitor SC2 is connected to the drain terminal of the second high-side switch HS2. A second end of the second snubber capacitor SC2 is connected to the second power line L2.

The power converter 10 includes an inductor I and output capacitors C2. A first end of the inductor I is connected to the source terminal of the first high-side switch HS1 and the source terminal of the second high-side switch HS2. A first end of each output capacitor C2 is connected to a second end of the inductor I. A second end of the output capacitor C2 is connected to the second power line L2. The first end of the output capacitor C2 is also connected to the positive electrode terminal of an external apparatus D. The second end of the output capacitor C2 is connected to the second power line L2 and the negative electrode terminal of the external apparatus D.

The power converter 10 includes a first drive circuit DC1, a second drive circuit DC2, a third drive circuit DC3, and a fourth drive circuit DC4. The first drive circuit DC1 is connected to the gate terminal of the first high-side switch HS1. The first drive circuit DC1 outputs a first driving signal to the gate terminal of the first high-side switch HS1. The second drive circuit DC2 is connected to the gate terminal of the first low-side switch LS1. The second drive circuit DC2 outputs a second driving signal to the gate terminal of the first low-side switch LS1.

The first driving signal and the second driving signal are pulse width modulation (PWM) signals. Each of the first drive circuit DC1 and the second drive circuit DC2 complementarily turns on and off a corresponding one of the first high-side switch HS1 and the first low-side switch LS1. Note that a period of time when the first high-side switch HS1 and the first low-side switch LS1 are both off is present on occasions, depending on the driving manner of the power converter 10.

The third drive circuit DC3 is connected to the gate terminal of the second high-side switch HS2. The third drive circuit DC3 outputs a third driving signal to the gate terminal of the second high-side switch HS2. The fourth drive circuit DC4 is connected to the gate terminal of the second low-side switch LS2. The fourth drive circuit DC4 outputs a fourth driving signal to the gate terminal of the second low-side switch LS2.

The third driving signal is a PWM signal like the first driving signal described above and becomes on and off at the same timing as that of the first driving signal. Likewise, the fourth driving signal is a PWM signal like the second driving signal described above and becomes on and off at the same timing as that of the second driving signal.

Layout of Substrate

The layout of wiring and elements in the power converter 10 will then be described.

Figure 4:
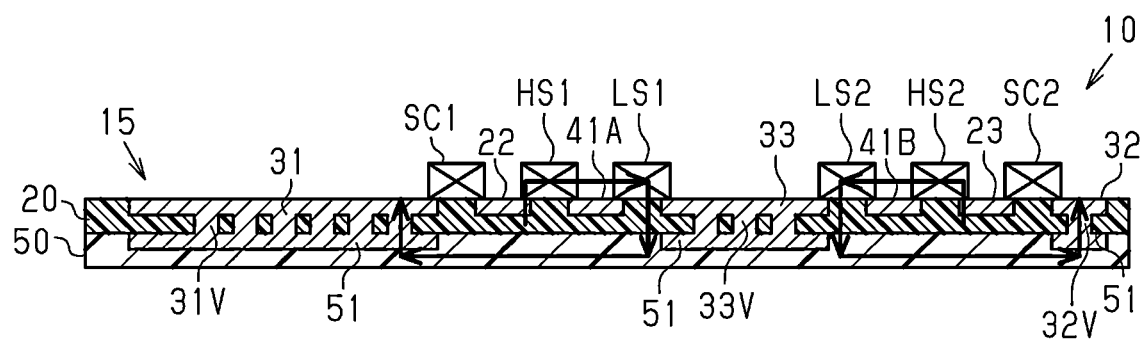
FIG. 4 is a cross-sectional view of the substrate of the first preferred embodiment the present invention.

As illustrated in FIG. 4, the power converter 10 includes a substrate 15. Further, the substrate 15 includes a first layer 20 and a second layer 50.

Figure 2:
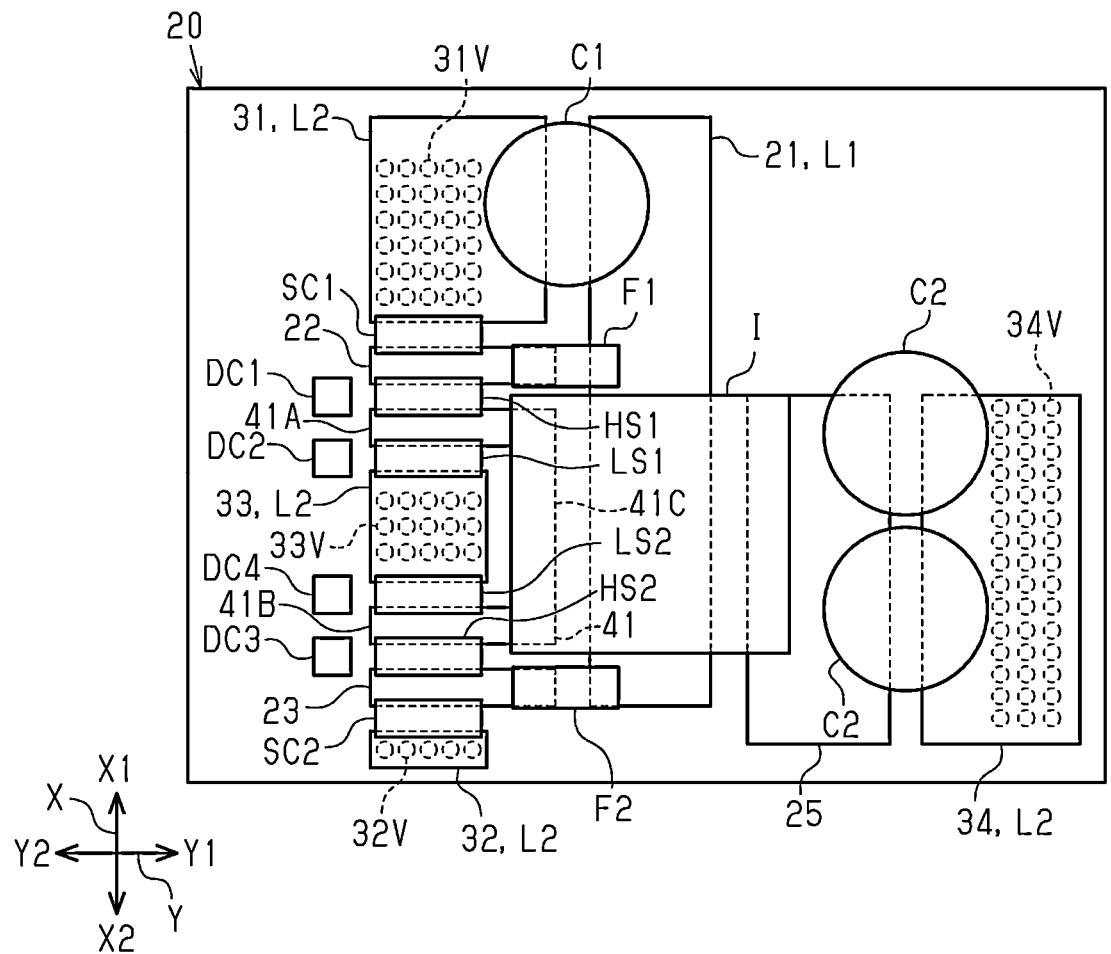
FIG. 2 is a plan view of a first layer in a substrate of the first preferred embodiment the present invention.

As illustrated in FIG. 2, the first layer 20 has a square or substantially square shape in a plan view in a direction perpendicular or substantially perpendicular to the main surface of the substrate 15. In the following description, an axis parallel or substantially parallel to a specific one side of the four sides forming the outer edge of the first layer 20 is a first axis X. In addition, an axis extending along the main surface of the substrate 15 and perpendicular or substantially perpendicular to the first axis X is a second axis Y. Further, one of two directions along the first axis X is a first positive direction X1, and a direction opposite to the first positive direction X1 is a first negative direction X2. One of two directions along the second axis Y is a second positive direction Y1, and a direction opposite to the second positive direction Y1 is a second negative direction Y2.

The first layer 20 includes high-potential wiring 21, first branching wiring 22, and second branching wiring 23. The high-potential wiring 21 is a portion of the first power line L1. The high-potential wiring 21 is also wiring to input, and the positive electrode terminal of the DC power supply B is connected to the high-potential wiring 21. The high-potential wiring 21 has a rectangular or substantially rectangular shape elongating along the first axis X. The high-potential wiring 21 is located in or substantially in the center of the first layer 20 in the directions along the second axis Y.

The first branching wiring 22 is located on the second negative direction Y2 side when viewed from the high-potential wiring 21. The first branching wiring 22 is also spaced away from the high-potential wiring 21. The first branching wiring 22 has a rectangular or substantially rectangular shape elongated along the second axis Y. The first fuse F1 is mounted on the first layer 20 in such a manner as to extend to the first branching wiring 22 and the high-potential wiring 21. The first branching wiring 22 thus has the same or substantially the same electric potential as that of the high-potential wiring 21.

The second branching wiring 23 is located on the second negative direction Y2 side when viewed from the high-potential wiring 21. The second branching wiring 23 is also spaced away from the high-potential wiring 21. The second branching wiring 23 is located on the first negative direction X2 side when viewed from the first branching wiring 22. The second branching wiring 23 has a rectangular or substantially rectangular shape elongated along the second axis Y. The second branching wiring 23 has the same shape as that of the first branching wiring 22. The second fuse F2 is mounted on the first layer 20 in such a manner as to extend to the second branching wiring 23 and the high-potential wiring 21. The second branching wiring 23 thus has the same or substantially the same electric potential as that of the high-potential wiring 21.

The first layer 20 includes first low-potential wiring 31, second low-potential wiring 32, third low-potential wiring 33, and fourth low-potential wiring 34 that serve as higher-layer low-potential wiring. Each of the first low-potential wiring 31 to the fourth low-potential wiring 34 is a portion of the second power line L2. The first low-potential wiring 31 is wiring for inputting, and the negative electrode terminal of the DC power supply B is connected to the first low-potential wiring 31.

The first low-potential wiring 31 is located on the second negative direction Y2 side when viewed from the high-potential wiring 21. The first low-potential wiring 31 is located on the first positive direction X1 side when viewed from the first branching wiring 22. The first low-potential wiring 31 is spaced away from the high-potential wiring 21 and the first branching wiring 22. The first low-potential wiring 31 has a square or substantially square shape, for example. The input capacitor C1 is mounted on the first layer 20 in such a manner as to extend to the first low-potential wiring 31 and the high-potential wiring 21. The first snubber capacitor SC1 is mounted on the first layer 20 in such a manner as to extend to the first low-potential wiring 31 and the first branching wiring 22. Note that the first snubber capacitor SC1 includes a plurality of capacitor elements connected in parallel. However, FIG. 2 illustrates one element in a simplified manner.

The second low-potential wiring 32 is located on the second negative direction Y2 side when viewed from the high-potential wiring 21. The second low-potential wiring 32 is also located on the first negative direction X2 side when viewed from the second branching wiring 23. The second low-potential wiring 32 is spaced away from the high-potential wiring 21 and the second branching wiring 23. The second low-potential wiring 32 has a square or substantially square shape, for example. The second snubber capacitor SC2 is mounted on the first layer 20 in such a manner as to extend to the second low-potential wiring 32 and the second branching wiring 23. Note that the second snubber capacitor SC2 includes a plurality of capacitor elements connected in parallel. However, FIG. 2 illustrates one element in a simplified manner.

The third low-potential wiring 33 is located on the second negative direction Y2 side when viewed from the high-potential wiring 21. The third low-potential wiring 33 is located on the first negative direction X2 side viewed from the first branching wiring 22 and on the first positive direction X1 side viewed from the second branching wiring 23. The third low-potential wiring 33 has a square or substantially square shape, for example.

The fourth low-potential wiring 34 is located on the second positive direction Y1 side when viewed from the high-potential wiring 21. The fourth low-potential wiring 34 is wiring for outputting connected to the negative electrode terminal of the external apparatus D. The fourth low-potential wiring 34 has a rectangular or substantially rectangular shape elongated along the first axis X.

As illustrated in FIGS. 2 and 4, the first layer 20 includes a plurality of first wiring vias 31V, a plurality of second wiring vias 32V, a plurality of third wiring vias 33V, and a plurality of fourth wiring vias 34V. The first wiring vias 31V to the fourth wiring vias 34V each have a columnar or substantially columnar shape. The first wiring vias 31V to the fourth wiring vias 34V each extend in the direction perpendicular or substantially perpendicular to the main surface of the substrate 15. In addition, the first wiring vias 31V to the fourth wiring vias 34V are each exposed in the surface opposite to the mounting surface of the first layer 20.

Figure 3:
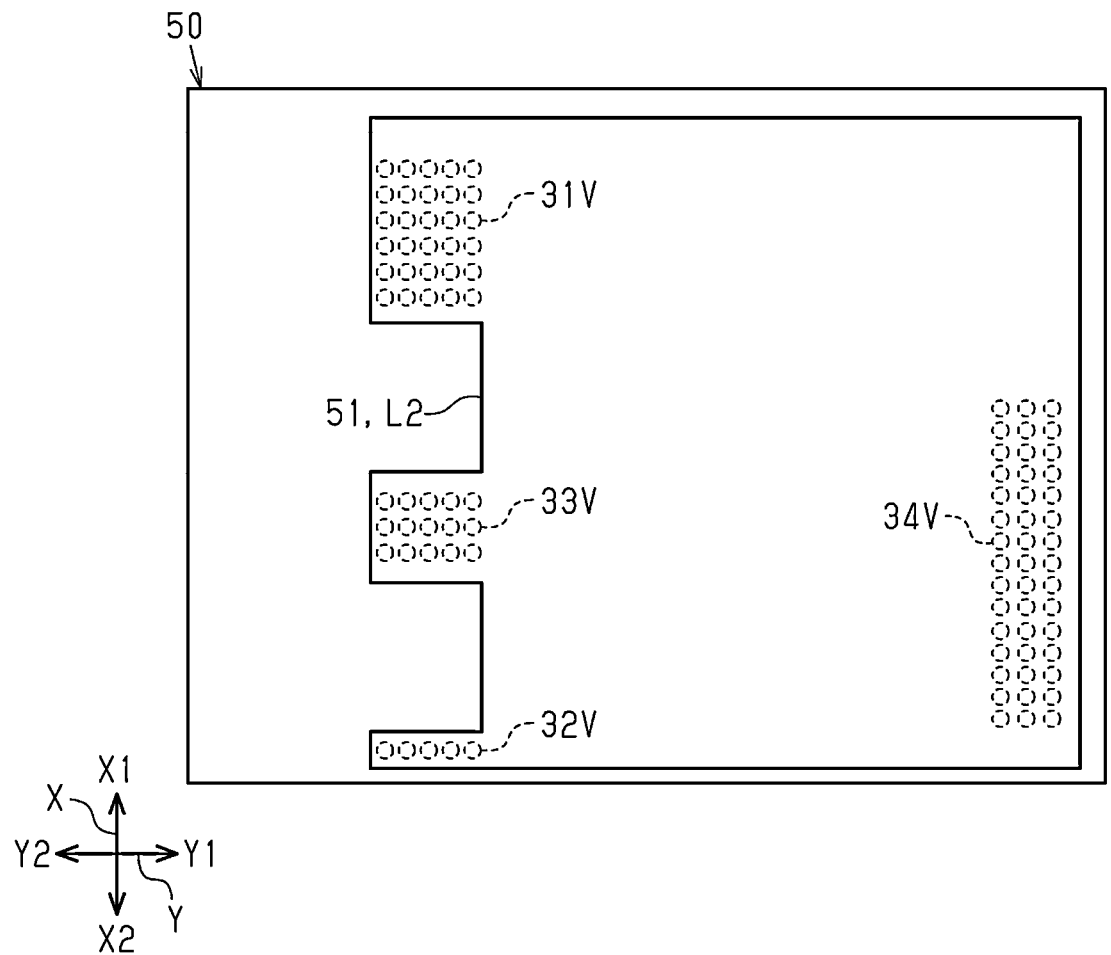
FIG. 3 is a plan view of a second layer in the substrate of the first preferred embodiment the present invention.

As illustrated in FIG. 2, when viewed in the direction perpendicular or substantially perpendicular to the main surface of the substrate 15, the first wiring vias 31V are located within the first low-potential wiring 31. When viewed in the direction perpendicular or substantially perpendicular to the main surface of the substrate 15, the second wiring vias 32V are located within the second low-potential wiring 32. When viewed in the direction perpendicular or substantially perpendicular to the main surface of the substrate 15, the third wiring vias 33V are located within the third low-potential wiring 33. When viewed in the direction perpendicular or substantially perpendicular to the main surface of the substrate 15, the fourth wiring vias 34V are located within the fourth low-potential wiring 34. FIGS. 2 and 3 illustrate the location of the first wiring vias 31V to the fourth wiring vias 34V by using broken lines. In addition, in FIGS. 2 and 3, only some of the first wiring vias 31V to the fourth wiring vias 34V are denoted by the reference numerals.

The first layer 20 includes an intermediate wiring 41. The intermediate wiring 41 is located on the second negative direction Y2 side when viewed from the high-potential wiring 21. The intermediate wiring 41 includes a first portion 41A, a second portion 41B, and a third portion 41C. The first portion 41A is located between the first branching wiring 22 and the third low-potential wiring 33. The first portion 41A is spaced away from the first branching wiring 22 and the third low-potential wiring 33. The first portion 41A has a rectangular or substantially rectangular shape elongated along the second axis Y.

The second portion 41B is located between the second branching wiring 23 and the third low-potential wiring 33. The second portion 41B is spaced away from the second branching wiring 23 and the third low-potential wiring 33. The second portion 41B has a rectangular or substantially rectangular shape elongated along the second axis Y.

The third portion 41C is located between the high-potential wiring 21 and the third low-potential wiring 33. The third portion 41C is spaced away from the high-potential wiring 21 and the third low-potential wiring 33. The third portion 41C has a rectangular or substantially rectangular shape elongated along the first axis X. A first end of the third portion 41C is connected to the first portion 41A.

A second end of the third portion 41C is connected to the second portion 41B, the second end being opposite to the first end.

The first high-side switch HS1 is mounted on the first layer 20 in such a manner as to extend to the first branching wiring 22 and the first portion 41A of the intermediate wiring 41. The first low-side switch LS1 is mounted on the first layer 20 in such a manner as to extend to the first portion 41A of the intermediate wiring 41 and the third low-potential wiring 33. As the result, the first snubber capacitor SC1, the first high-side switch HS1, and the first low-side switch LS1 are arranged in this order next to each other in the first negative direction X2. Note that the term "next to each other" denotes a state where a different component or element mounted on the first layer 20 is not interposed between the elements next to each other. Accordingly, a gap may be present between the two elements arranged next to each other. Any wiring may be present between the two elements next to each other.

The first drive circuit DC1 is mounted at a position next to the first high-side switch HS1 in the second negative direction Y2 on the first layer 20. The second drive circuit DC2 is mounted at a position next to the first low-side switch LS1 in the second negative direction Y2 on the first layer 20. The shortest distance from the second drive circuit DC2 to the first low-side switch LS1 on the first layer 20 is equal or substantially equal to the shortest distance from the first drive circuit DC1 to the first high-side switch HS1 on the first layer 20.

The second high-side switch HS2 is mounted on the first layer 20 in such a manner as to extend to the second branching wiring 23 and the second portion 41B of the intermediate wiring 41. The second low-side switch LS2 is mounted on the first layer 20 in such a manner as to extend to the second portion 41B of the intermediate wiring 41 and the third low-potential wiring 33. As the result, the second snubber capacitor SC2, the second high-side switch HS2, and the second low-side switch LS2 are arranged in this order next to each other in the first positive direction X1. The direction in which the second snubber capacitor SC2 and other elements are arranged is opposite to the direction in which the first snubber capacitor SC1 and other elements are arranged.

The third drive circuit DC3 is mounted at a position next to the second high-side switch HS2 in the second negative direction Y2 on the first layer 20. The shortest distance from the third drive circuit DC3 to the second high-side switch HS2 on the first layer 20 is equal or substantially equal to the shortest distance from the first drive circuit DC1 to the first high-side switch HS1 on the first layer 20.

The fourth drive circuit DC4 is mounted at a position next to the second low-side switch LS2 in the second negative direction Y2 on the first layer 20. The shortest distance from the fourth drive circuit DC4 to the second low-side switch LS2 on the first layer 20 is equal or substantially equal to the shortest distance from the first drive circuit DC1 to the first high-side switch HS1 on the first layer 20.

Note that a loop including the first snubber capacitor SC1, the first high-side switch HS1, and the first low-side switch LS1 is a first current loop. A loop including the second snubber capacitor SC2, the second high-side switch HS2, and the second low-side switch LS2 is a second current loop. At this time, the direction of current flowing through the first current loop is the first negative direction X2 on the first layer 20. In contrast, the direction of current flowing through the second current loop is the first positive direction X1 on the first layer 20. The direction of the current flowing through the first current loop is thus opposite to the direction of the current flowing through the second current loop.

More specifically, the elements included in the first current loop are located on the first positive direction X1 side when viewed from the third low-potential wiring 33. In contrast, the elements included in the second current loop are located on the first negative direction X2 side when viewed from the third low-potential wiring 33. The third low-potential wiring 33 is thus located between the first current loop and the second current loop. In addition, the elements included in the first current loop are disposed to be twofold symmetric to the elements included in the second current loop with respect to the center point of the third low-potential wiring 33.

The first layer 20 includes an output wiring 25. The output wiring 25 is wiring connected to the positive electrode terminal of the external apparatus D. When viewed from the high-potential wiring 21 and the fourth low-potential wiring 34, respectively, the output wiring 25 is located on the second positive direction Y1 side and on the second negative direction Y2 side. The output wiring 25 is spaced away from the high-potential wiring 21 and the fourth low-potential wiring 34. The output wiring 25 has a rectangular or substantially rectangular shape elongated along the first axis X.

The inductor I is mounted on the first layer 20 in such a manner as to extend to the third portion 41C of the intermediate wiring 41 and the output wiring 25. Note that the inductor I overlaps with the high-potential wiring 21 when viewed in the direction perpendicular or substantially perpendicular to the main surface of the substrate 15, but the inductor I is not directly connected to the high-potential wiring 21.

On the second positive direction Y1 side, the inductor I is next to each of the first high-side switch HS1, the first low-side switch LS1, the second high-side switch HS2, and the second low-side switch LS2. The first drive circuit DC1, the first high-side switch HS1, and the inductor I are thus arranged in this order in the second positive direction Y1. In addition, the second positive direction Y1 in which the first drive circuit DC1, the first high-side switch HS1, and the inductor I are arrange is perpendicular or substantially perpendicular to the first negative direction X2 in which the first snubber capacitor SC1, the first high-side switch HS1, and the first low-side switch LS1 are arranged.

Likewise, the second drive circuit DC2, the first low-side switch LS1, and the inductor I are arranged in this order in the second positive direction Y1. In addition, the third drive circuit DC3, the second high-side switch HS2, and the inductor I are arranged in this order in the second positive direction Y1. Further, the fourth drive circuit DC4, the second low-side switch LS2, and the inductor I are arranged in this order in the second positive direction Y1.

Each output capacitor C2 is mounted on the first layer 20 in such a manner as to extend to the output wiring 25 and the fourth low-potential wiring 34. In the example in this preferred embodiment, the two output capacitors C2 are mounted in parallel.

As illustrated in FIG. 4, the second layer 50 is stacked on a surface opposite to the mounting surface of the first layer 20. As illustrated in FIG. 3, the second layer 50 includes lower-layer low-potential wiring 51. The lower-layer low-potential wiring 51 is a portion of the second power line L2. When viewed in the direction perpendicular or substantially perpendicular to the main surface of the substrate 15, the lower-layer low-potential wiring 51 overlaps with the entire area of the first low-potential wiring 31 to the fourth low-potential wiring 34 of the first layer 20. In addition, the lower-layer low-potential wiring 51 is not divided and is one entirely continuous wiring component.

As illustrated in FIG. 4, the lower-layer low-potential wiring 51 is connected to the first low-potential wiring 31 of the first layer 20 with the first wiring vias 31V interposed therebetween. The lower-layer low-potential wiring 51 is connected to the second low-potential wiring 32 of the first layer 20 with the second wiring vias 32V interposed therebetween. The lower-layer low-potential wiring 51 is connected to the third low-potential wiring 33 of the first layer 20 with the third wiring vias 33V interposed therebetween. In addition, as illustrated in FIGS. 2 and 3, the lower-layer low-potential wiring 51 is connected to the fourth low-potential wiring 34 of the first layer 20 with the fourth wiring vias 34V interposed therebetween.

Actions in This Preferred Embodiment

In response to the power converter 10 being driven, appropriate ones of the first high-side switch HS1, the first low-side switch LS1, the second high-side switch HS2, and the second low-side switch LS2 are turned on or off. In response to this, current flows to the wiring of the first layer 20 and the second layer 50 of the substrate 15. At this time, the two current loops are generated. As represented by an arrow in FIG. 4, the first current loop is a path to the second end of the first snubber capacitor SC1 via the first end of the first snubber capacitor SC1, the first branching wiring 22, the first high-side switch HS1, the first portion 41A of the intermediate wiring 41, the first low-side switch LS1, the third low-potential wiring 33, the lower-layer low-potential wiring 51, and the first low-potential wiring 31. Likewise, as represented by an arrow in FIG. 4, the second current loop is a path to the second end of the second snubber capacitor SC2 via the first end of the second snubber capacitor SC2, the second branching wiring 23, the second high-side switch HS2, the second portion 41B of the intermediate wiring 41, the second low-side switch LS2, the third low-potential wiring 33, the lower-layer low-potential wiring 51, and the second low-potential wiring 32.

Advantageous Effects of First Preferred Embodiment (1-1) In the preferred embodiment above, the elements of the first current loop are separated from the elements of the second current loop by the third low-potential wiring 33. In addition, the third low-potential wiring 33 is a portion of the second power line L2 and thus has a stable electric potential. Accordingly, noise attributed to the flow of current through the elements of the first current loop and noise attributed to the flow of current through the elements of the second current loop are generated independently. On the first layer 20, the direction of the current flowing through the elements of the first current loop is opposite to the direction of the current flowing through the elements of the second current loop. As the result, the noise generated in the first current loop and the noise generated in the second current loop are mutually cancelled. The noise may thus be reduced in the power converter 10 as a whole.

(1-2) In the preferred embodiment above, the elements of the first current loop and the elements of the second current loop are disposed to be twofold symmetric, and thus the path length of the first current loop is equal or substantially equal to the path length of the second current loop. The magnitude of the parasitic inductance of the first current loop may thus be made the same as the magnitude of the parasitic inductance of the second current loop. Making the magnitude of the parasitic inductance the same in this manner enables uniform current temporarily flowing to the switch. As the result, an increase in switching loss, a temperature increase of the switch elements, and the like are prevented.

(1-3) In the preferred embodiment above, the first snubber capacitor SC1, the first high-side switch HS1, and the first low-side switch LS1 are arranged in this order next to each other in the first negative direction X2. The order of the elements next to each other is the same as the order of the flow of the current. Since the length of the wiring from the first snubber capacitor SC1 to the first low-side switch LS1 may thus be shortened, the path length of the first current loop may be shortened. As the result, the magnitude of the parasitic inductance of the first current loop may be made lower. Note that in this respect, the same holds true for the arrangement of the second snubber capacitor SC2, the second high-side switch HS2, and the second low-side switch LS2.

(1-4) In the preferred embodiment above, the first drive circuit DC1, the first high-side switch HS1, and the inductor I are arranged in this order in the second positive direction Y1. The length of the wiring from the first drive circuit DC1 to the inductor I may thus be shortened. Shortening the length of the wiring in this manner prevents misoperation of the first high-side switch HS1 due to noise or the like and an increase of switching loss. In this respect, the same holds true for the second drive circuit DC2 to the fourth drive circuit DC4.

(1-5) In addition, the second positive direction Y1 in which the first drive circuit DC1 and other elements are arranged is perpendicular or substantially perpendicular to the first negative direction X2 in which the first snubber capacitor SC1 and other are arranged. Accordingly, the parasitic inductance generated in the first current loop is less likely to influence the parasitic inductance generated in the current loop including the first drive circuit DC1. In this respect, the same holds true for the second drive circuit DC2 to the fourth drive circuit DC4.

(1-6) In the preferred embodiment above, the shortest distance from the first drive circuit DC1 to the first high-side switch HS1 is equal or substantially equal to the shortest distance from the second drive circuit DC2 to the first low-side switch LS1. Likewise, the shortest distance from the first drive circuit DC1 to the first high-side switch HS1 is equal or substantially equal to the shortest distance from the third drive circuit DC3 to the second high-side switch HS2 and the shortest distance from the fourth drive circuit DC4 to the second low-side switch LS2. This enables the prevention of an on/off timing difference between the switches and thus enables the prevention of an increase of power loss in the switches.

(1-7) In the preferred embodiment above, the first current loop is a path from the first layer 20 to the second layer 50 and then again to the first layer 20. In the substrate 15, the layers are thinner than the dimensions in the directions along the first axis X of the substrate 15 and the dimensions in the directions along the second axis Y thereof. The first current loop thus has a smaller diameter than that in a case where a current loop is formed on one layer. Making the diameter of the first current loop smaller enables parasitic inductance generated in the first current loop to be reduced. In this respect, the same holds true for the second current loop.

(1-8) In the preferred embodiment above, the elements of the first current loop are separated from the elements of the second current loop by the third low-potential wiring 33. In addition, the third low-potential wiring 33 is grounded and thus is one of the wiring components having the most stable electric potential of the wiring components of the substrate 15. Separating the elements of the first current loop from the elements of the second current loop by the third low-potential wiring 33 having the stable electric potential as above helps the formation of the first current loop and the second current loop as independent loops in which the flows of the current do not interfere with each other.

Second Preferred Embodiment

Hereinafter, a power converter according to a second preferred embodiment of the present invention will be described. Note that components are enlarged in some drawings for easier understanding. The ratios of the dimensions of the components are different from the actual ratios of the dimensions or in the components in a different drawing on occasions.

Circuit Configuration of Power Converter

The circuit configuration of a power converter 100 of the second preferred embodiment is different from the power converter 10 of the first preferred embodiment in that the power converter 100 does not include the first fuse F1 and the second fuse F2. That is, in the power converter 100 of the second preferred embodiment, the drain terminal of the first high-side switch HS1 is connected to the first power line L1 without a different element interposed therebetween. The drain terminal of the second high-side switch HS2 is also connected to the first power line L1 without a different element interposed therebetween.

Layout of Substrate

The layout of wiring and elements in the power converter 100 will then be described.

Figure 5:
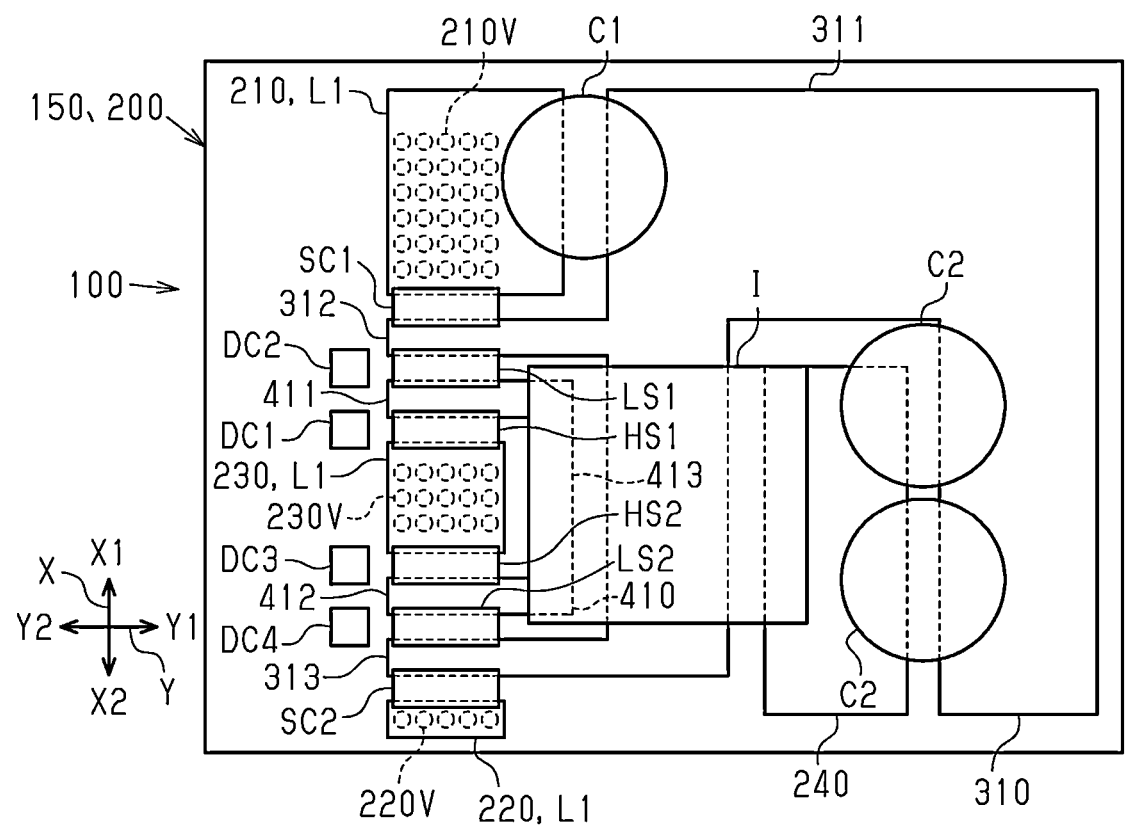
FIG. 5 is a plan view of a first layer in a substrate of a second preferred embodiment the present invention.
Figure 6:
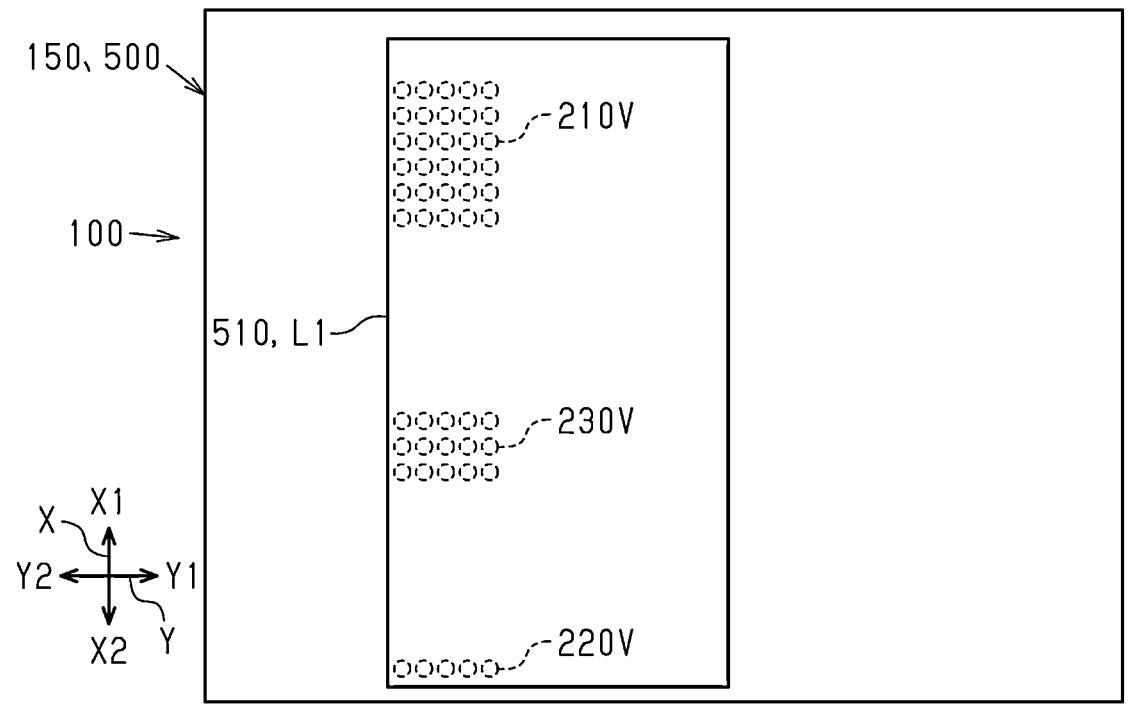
FIG. 6 is a plan view of a second layer in the substrate of the second preferred embodiment of the present invention.

As illustrated in FIGS. 5 and 6, the power converter 100 includes a substrate 150. Further, the substrate 150 includes a first layer 200 and a second layer 500.

As illustrated in FIG. 5, the first layer 200 has a square or substantially square shape in a plan view in the direction perpendicular or substantially perpendicular to the main surface of the substrate 150. Note that in the following description, an axis parallel or substantially parallel to a specific one side of the four sides forming the outer edge of the first layer 200 is a first axis X. In addition, an axis extending along the main surface of the substrate 150 and perpendicular or substantially perpendicular to the first axis X is a second axis Y. Further, one of two directions along the first axis X is a first positive direction X1, and a direction opposite to the first positive direction X1 is a first negative direction X2. One of two directions along the second axis Y is a second positive direction Y1, and a direction opposite to the second positive direction Y1 is a second negative direction Y2.

The first layer 200 includes first high-potential wiring 210, second high-potential wiring 220, third high-potential wiring 230, and fourth high-potential wiring 240 that serve as higher-layer high-potential wiring. The first high-potential wiring 210 to the third high-potential wiring 230 of these are each portion of the first power line L1.

The first high-potential wiring 210 is located on the first positive direction X1 side in the directions along the first axis X when viewed from the center of the first layer 200. The first high-potential wiring 210 is also located on the second negative direction Y2 side of the directions along the second axis Y when viewed from the center of the first layer 200. The first high-potential wiring 210 has a square or substantially square shape, for example. Each of the sides of the first high-potential wiring 210 is parallel or substantially parallel to a corresponding one of the first axis X and the second axis Y. Note that the first high-potential wiring 210 is wiring for inputting, and the positive electrode terminal of the DC power supply B is connected to the first high-potential wiring 210.

The second high-potential wiring 220 is located on the first negative direction X2 side in the directions along the first axis X when viewed from the center of the first layer 200. The second high-potential wiring 220 is also located on the second negative direction Y2 side in the directions along the second axis Y when viewed from the center of the first layer 200. The second high-potential wiring 220 has a square or substantially square shape, for example. Each of the sides of the second high-potential wiring 220 is parallel or substantially parallel to a corresponding one of the first axis X and the second axis Y.

The third high-potential wiring 230 is located between the first high-potential wiring 210 and the second high-potential wiring 220 in the directions along the first axis X. The third high-potential wiring 230 is spaced away from the first high-potential wiring 210 and the second high-potential wiring 220. The third high-potential wiring 230 has a square or substantially square shape, for example. Each of the sides of the third high-potential wiring 230 is parallel or substantially parallel to a corresponding one of the first axis X and the second axis Y.

The fourth high-potential wiring 240 is located on the second positive direction Y1 side in the directions along the second axis Y when viewed from the center of the first layer 200. The fourth high-potential wiring 240 has a rectangular or substantially rectangular shape elongated along the first axis X. The fourth high-potential wiring 240 is close to one of the sides, of the first layer 200, on the first negative direction X2 side in the directions along the first axis X. That is, one of the sides, of the fourth high-potential wiring 240, on the first positive direction X1 side is farther from one of the sides, of the first layer 200, on the first positive direction X1 side. The fourth high-potential wiring 240 is also spaced away from one of the sides, of the first layer 200, on the second positive direction Y1 side. Note that the fourth high-potential wiring 240 is wiring for outputting connected to the positive electrode terminal of the external apparatus D.

The first layer 200 includes a plurality of first wiring vias 210V, a plurality of second wiring vias 220V, and a plurality of third wiring vias 230V. The first wiring vias 210V to the third wiring vias 230V each have a columnar or substantially columnar shape. The first wiring vias 210V to the third wiring vias 230V each extend in the direction perpendicular or substantially perpendicular to the main surface of the substrate 150. In addition, the first wiring vias 210V to the third wiring vias 230V are each exposed in the surface opposite to the mounting surface of the first layer 200.

When viewed in the direction perpendicular or substantially perpendicular to the main surface of the substrate 150, the first wiring vias 210V are located within the first high-potential wiring 210. When viewed in the direction perpendicular or substantially perpendicular to the main surface of the substrate 150, the second wiring vias 220V are located within the second high-potential wiring 220. When viewed in the direction perpendicular or substantially perpendicular to the main surface of the substrate 150, the third wiring vias 230V are located within the third high-potential wiring 230. FIGS. 5 and 6 illustrate the location of the first wiring vias 210V to the third wiring vias 230V by using broken lines. In addition, in FIGS. 5 and 6, only some of the first wiring vias 210V to the third wiring vias 230V are denoted by the reference numerals.

The first layer 200 includes low-potential wiring 310. The low-potential wiring 310 includes a body portion 311, a first branching portion 312, and a second branching portion 313. The body portion 311 surrounds the fourth high-potential wiring 240 from three sides that are the second positive direction Y1 side, the first positive direction X1 side, and the second negative direction Y2 side. In other words, the body portion 311 has a substantially U shape with the first negative direction X2 side thereof being open. The input capacitor C1 is mounted on the first layer 200 in such a manner as to extend to the first high-potential wiring 210 and the body portion 311 of the low-potential wiring 310. Each output capacitor C2 is also mounted on the first layer 200 in such a manner as to extend to the fourth high-potential wiring 240 and the body portion 311 of the low-potential wiring 310. In the example in this preferred embodiment, the two output capacitors C2 are mounted in parallel or substantially in parallel.

The first branching portion 312 extends in the second negative direction Y2 from an edge, of the body portion 311, on the second negative direction Y2 side. The first branching portion 312 has a rectangular or substantially rectangular shape elongated along the second axis Y. The first branching portion 312 is located between the first high-potential wiring 210 and the third high-potential wiring 230. The first snubber capacitor SC1 is mounted on the first layer 200 in such a manner as to extend to the first high-potential wiring 210 and the first branching portion 312 of the low-potential wiring 310. Note that the first snubber capacitor SC1 includes a plurality of capacitor elements connected in parallel. However, FIG. 5 illustrates one element in a simplified manner.

The second branching portion 313 extends in the second negative direction Y2 from an edge, of the body portion 311, on the second negative direction Y2 side. The second branching portion 313 has a rectangular or substantially rectangular shape elongated along the second axis Y. The second branching portion 313 is located between the second high-potential wiring 220 and the third high-potential wiring 230. The second snubber capacitor SC2 is mounted on the first layer 200 in such a manner as to extend to the second high-potential wiring 220 and the second branching portion 313 of the low-potential wiring 310. Note that the second snubber capacitor SC2 includes a plurality of capacitor elements connected in parallel. However, FIG. 5 illustrates one element in a simplified manner.

The first layer 200 includes an intermediate wiring 410. The intermediate wiring 410 is located between the first branching portion 312 of the low-potential wiring 310 and the second branching portion 313 in the directions along the first axis X. The intermediate wiring 410 also includes a first portion 411, a second portion 412, and a third portion 413. The first portion 411 is located between the first branching portion 312 of the low-potential wiring 310 and the third high-potential wiring 230. The first portion 411 is spaced away from the first branching portion 312 and the third high-potential wiring 230. The first portion 411 has a rectangular or substantially rectangular shape elongated along the second axis Y.

The second portion 412 is located between the second branching portion 313 of the low-potential wiring 310 and the third high-potential wiring 230. The second portion 412 is spaced away from the second branching portion 313 and the third high-potential wiring 230. The second portion 412 has a rectangular or substantially rectangular shape elongated along the second axis Y.

The third portion 41C is located between the body portion 311 of the low-potential wiring 310 and the third high-potential wiring 230. The third portion 413 is spaced away from the body portion 311 and the third high-potential wiring 230. The third portion 413 has a rectangular or substantially rectangular shape elongated along the first axis X. A first end of the third portion 413 is connected to the first portion 411. A second end, of the third portion 413, opposite to the first end is connected to the second portion 412.

The first high-side switch HS1 is mounted on the first layer 200 in such a manner as to extend to the third high-potential wiring 230 and the first portion 411 of the intermediate wiring 410. The first low-side switch LS1 is mounted on the first layer 200 in such a manner as to extend to the first portion 411 of the intermediate wiring 410 and the first branching portion 312.

The first drive circuit DC1 is mounted at a position next to the first high-side switch HS1 in the second negative direction Y2 on the first layer 200. The second drive circuit DC2 is mounted at a position next to the first low-side switch LS1 in the second negative direction Y2 on the first layer 200. The shortest distance from the second drive circuit DC2 to the first low-side switch LS1 on the first layer 200 is equal or substantially equal to the shortest distance from the first drive circuit DC1 to the first high-side switch HS1 on the first layer 200.

The second high-side switch HS2 is mounted on the first layer 200 in such a manner as to extend to the third high-potential wiring 230 and the second portion 412 of the intermediate wiring 410. The second low-side switch LS2 is mounted on the first layer 200 in such a manner as to extend to the second portion 412 of the intermediate wiring 410 and the second branching portion 313.

The third drive circuit DC3 is mounted at a position next to the second high-side switch HS2 in the second negative direction Y2 on the first layer 200. The shortest distance from the third drive circuit DC3 to the second high-side switch HS2 on the first layer 200 is equal or substantially equal to the shortest distance from the first drive circuit DC1 to the first high-side switch HS1 on the first layer 200.

The fourth drive circuit DC4 is mounted at a position next to the second low-side switch LS2 in the second negative direction Y2 on the first layer 200. The shortest distance from the fourth drive circuit DC4 to the second low-side switch LS2 on the first layer 200 is equal or substantially equal to the shortest distance from the first drive circuit DC1 to the first high-side switch HS1 on the first layer 200.

Note that a loop including the first snubber capacitor SC1, the first high-side switch HS1, and the first low-side switch LS1 is a first current loop. A loop including the second snubber capacitor SC2, the second high-side switch HS2, and the second low-side switch LS2 is a second current loop. At this time, the direction of current flowing through the first current loop is the first positive direction X1 on the first layer 20. In contrast, the direction of current flowing through the second current loop is the first negative direction X2 on the first layer 20. The direction of the current flowing through the first current loop is thus opposite to the direction of the current flowing through the second current loop.

More specifically, the elements included in the first current loop are located on the first positive direction X1 side when viewed from the third high-potential wiring 230. In contrast, the elements included in the second current loop are located on the first negative direction X2 side when viewed from the third high-potential wiring 230. The third high-potential wiring 230 is thus located between the first current loop and the second current loop. In addition, the elements included in the first current loop are disposed to be twofold symmetric to the elements included in the second current loop with respect to the center point of the third high-potential wiring 230.

The inductor I is mounted on the first layer 200 in such a manner as to extend to the fourth high-potential wiring 240 and the third portion 413 of the intermediate wiring 410. Note that the inductor I overlaps with the low-potential wiring 310 when viewed in in the direction perpendicular or substantially perpendicular to the main surface of the substrate 150, but the inductor I is not directly connected to the low-potential wiring 310.

On the second positive direction Y1 side, the inductor I is next to each of the first high-side switch HS1, the first low-side switch LS1, the second high-side switch HS2, and the second low-side switch LS2. The first drive circuit DC1, the first high-side switch HS1, and the inductor I are thus arranged in this order in the second positive direction Y1. In addition, the second positive direction Y1 in which the first drive circuit DC1, the first high-side switch HS1, and the inductor I are arranged is perpendicular or substantially perpendicular to the first negative direction X2 in which the first snubber capacitor SC1, the first high-side switch HS1, and the first low-side switch LS1 are arranged.

Likewise, the second drive circuit DC2, the first low-side switch LS1, and the inductor I are arranged in this order in the second positive direction Y1. In addition, the third drive circuit DC3, the second high-side switch HS2, and the inductor I are arranged in this order in the second positive direction Y1. Further, the fourth drive circuit DC4, the second low-side switch LS2, and the inductor I are arranged in this order in the second positive direction Y1.

As illustrated in FIG. 6, the second layer 500 is stacked on a surface opposite to the mounting surface of the first layer 200. The second layer 500 includes lower-layer high-potential wiring 510. The lower-layer high-potential wiring 510 is a portion of the first power line L1. The lower-layer high-potential wiring 510 overlaps with the entire area of the first high-potential wiring 210 to the third high-potential wiring 230 of the first layer 200 when viewed in the direction perpendicular or substantially perpendicular to the main surface of the substrate 150. In addition, the lower-layer high-potential wiring 510 is not divided and is one entirely continuous wiring component.

As illustrated in FIGS. 5 and 6, the lower-layer high-potential wiring 510 is connected to the first high-potential wiring 210 of the first layer 200 with the first wiring vias 210V interposed therebetween. The lower-layer high-potential wiring 510 is connected to the second high-potential wiring 220 of the first layer 200 with the second wiring vias 220V interposed therebetween. The lower-layer high-potential wiring 510 is connected to the third high-potential wiring 230 of the first layer 200 with the third wiring vias 230V interposed therebetween.

Advantageous Effects of Second Preferred Embodiment

According to the second preferred embodiment, the following advantageous effects are exerted in addition to the advantageous effects in (1-2) to (1-7) of the first preferred embodiment.

(2-1) In the preferred embodiment above, the elements of the first current loop are separated from the elements of the second current loop by the third high-potential wiring 230. The third high-potential wiring 230 is a portion of the first power line L1 and thus has a stable electric potential. Accordingly, noise attributed to the flow of current through the elements of the first current loop and noise attributed to the flow of current through the elements of the second current loop are generated independently. On the first layer 200, the direction of the current flowing through the elements of the first current loop is opposite to the direction of the current flowing through the elements of the second current loop. As the result, the noise generated in the first current loop and the noise generated in the second current loop are mutually cancelled. The noise may thus be reduced in the power converter 100 as a whole.

(2-2) In the preferred embodiment above, the elements of the first current loop are separated from the elements of the second current loop by the third high-potential wiring 230. In addition, the third high-potential wiring 230 is connected to the positive electrode terminal of the DC power supply B and thus is one of the wiring components having the most stable electric potential of the wiring components of the substrate 150. Separating the elements of the first current loop from the elements of the second current loop by the third high-potential wiring 230 having the stable electric potential as above helps the formation of the first current loop and the second current loop as independent loops in which the flows of the current do not interfere with each other.

Other Preferred Embodiments

The preferred embodiments above and modifications below may be implemented in combination with each other as long as the combination is not technically inconsistent. Note that the following modifications of the first preferred embodiment may also be applied likewise to the second preferred embodiment unless otherwise particularly referred thereto.

An unwired area without any wiring may be located between the group of the elements of the first current loop and the group of the elements of the second current loop.

Figure 7:
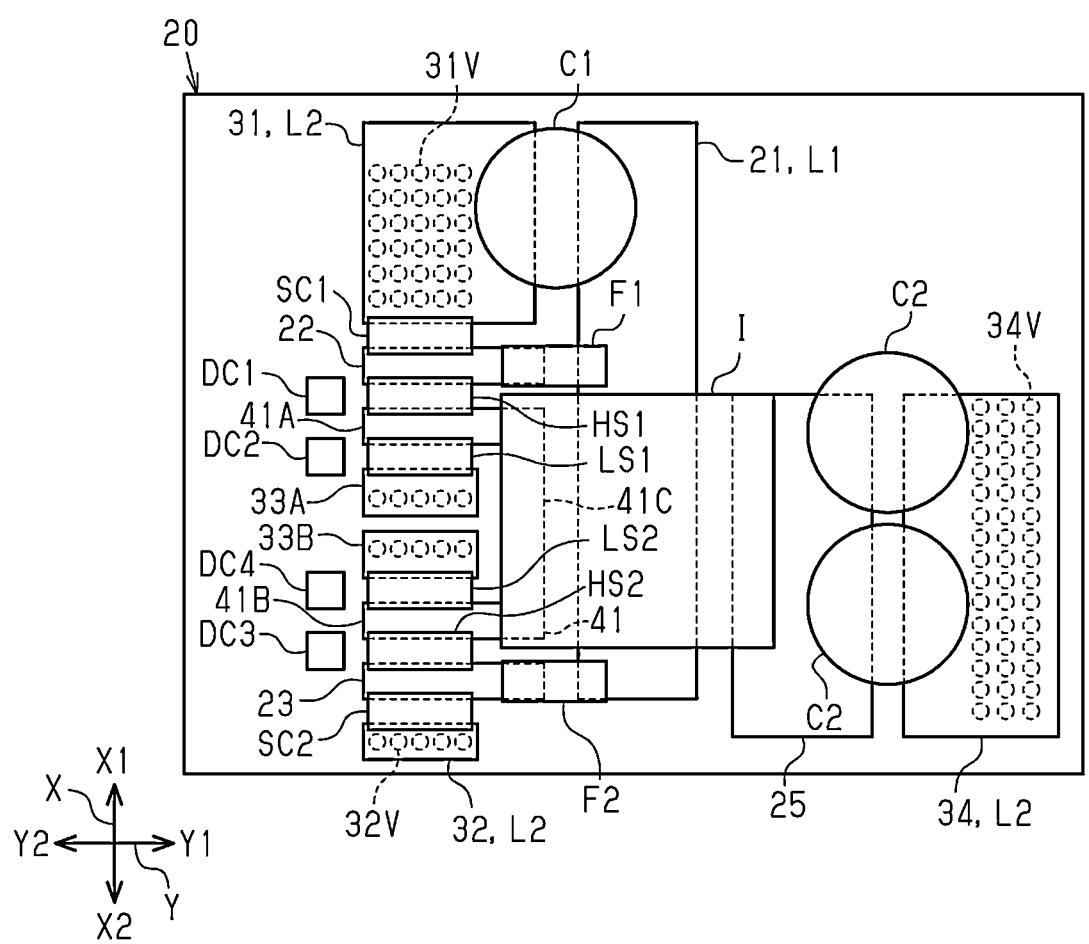
FIG. 7 is a plan view of a second layer in a substrate of a modification of a preferred embodiment of the present invention.

Specifically, in the example illustrated in FIG. 7, the third low-potential wiring 33 has a shape different from that of the power converter 10 of the first preferred embodiment. In the example illustrated in FIG. 7, the first layer 20 includes low-potential wiring 33A to which the first low-side switch LS1 is connected and low-potential wiring 33B to which the second low-side switch LS2 is connected. The low-potential wiring 33A and the low-potential wiring 33B are spaced away from each other along the first axis X. The substrate 15 thus has the unwired area without any wiring between the group of the elements of the first current loop and the group of the elements of the second current loop. In addition, current does not flow through the unwired area on the substrate 15, and thus the unwired area has a stable electric potential. As described above, the presence of an area having a stable electric potential between the group of the elements of the first current loop and the group of the elements of the second current loop helps the elements of the first current loop and the elements of the second current loop to form independent loops. Note that the same holds true for the power converter 100 of the second preferred embodiment if the third high-potential wiring 230 is separated into two wiring components.

The first snubber capacitor SC1, the first high-side switch HS1, and the first low-side switch LS1 may be arranged in any direction. These elements may be arranged in the second negative direction Y2 or in a direction perpendicular or substantially perpendicular to the second axis Y.

The first snubber capacitor SC1, the first high-side switch HS1, and the first low-side switch LS1 may also be arranged in any order. For example, the first high-side switch HS1, the first low-side switch LS1, and the first snubber capacitor SC1 may be arranged in this order.

Note that if the arrangement of the first snubber capacitor SC1, the first high-side switch HS1, and the first low-side switch LS1 is changed as in the modification above, the layout of the second snubber capacitor SC2 and other elements may be changed to result in a layout in which the first set of elements and the second set of elements are twofold symmetric to each other. In addition, it suffices that on the first layer 20, the direction of the current flowing through the first current loop is opposite to the direction of the current flowing through the second current loop.

The first drive circuit DC1, the first high-side switch HS1, and the inductor I may be arranged in any direction. These elements may be arranged in the first negative direction X2 or in a direction perpendicular or substantially perpendicular to or parallel to the direction in which the first snubber capacitor SC1, the first high-side switch HS1, and the first low-side switch LS1 are arranged. In this respect, the same holds true for the second drive circuit DC2 to the fourth drive circuit DC4.

The shortest distances from the respective drive circuits to the switches may be mutually different.

The substrate 15 does not have to include the second layer 50. That is, the substrate 15 may include a single layer. In this case, for example, it suffices that on the first layer 20, the first low-potential wiring 31 to the fourth low-potential wiring 34 are electrically connected to each other.

The substrate 15 may also have a different layer in addition to the first layer 20 and the second layer 50. In this case, a portion of the wiring components of the power converter 10 may be provided to the layer different from the first layer 20 and the second layer 50. A circuit different from the power converter 10 may be provided to the layer different from the first layer 20 and the second layer 50.

APPENDIX

Technical ideas comprehended from the preferred embodiments above and the modifications thereof will be described.

<1>

A power converter includes a substrate, a first power line, a second power line with an electrical potential lower than an electrical potential of the first power line, a first high-side switch including a first terminal connected to the first power line, a first low-side switch including a first terminal connected to a second terminal of the first high-side switch and a second terminal connected to the second power line, a first capacitor including a first end connected to the first terminal of the first high-side switch and a second end connected to the second power line, a second high-side switch that includes a first terminal connected to the first power line and that is parallel or substantially parallel to the first high-side switch, a second low-side switch including a first terminal connected to a second terminal of the second high-side switch and a second terminal connected to the second power line, a second capacitor including a first end connected to the first terminal of the second high-side switch and a second end connected to the second power line, an inductor including a first end connected to the second terminal of the first high-side switch and the second terminal of the second high-side switch, an output capacitor including a first end connected to a second end of the inductor and a second end connected to the second power line, a first current loop including the first capacitor, the first high-side switch, and the first low-side switch, and a second current loop including the second capacitor, the second high-side switch, and the second low-side switch. The first power line, the second power line, the first high-side switch, the first low-side switch, the first capacitor, the second high-side switch, the second low-side switch, the second capacitor, the inductor, and the output capacitor are provided on the substrate.

In a plan view in a direction perpendicular or substantially perpendicular to a main surface of the substrate, the first power line or the second power line is located between the first current loop and the second current loop, and a direction of current flowing through the first current loop is opposite to a direction of current flowing through the second current loop.

<2>

In the power converter according to <1> above, the substrate includes an unwired area without any wiring, and in the plan view in the direction perpendicular or substantially perpendicular to the main surface of the substrate, the unwired area is located between the first current loop and the second current loop.

<3>

In the power converter according to <1> or <2> above, the first capacitor, the first high-side switch, and the first low-side switch are arranged in this order next to each other in a direction parallel or substantially parallel to the main surface of the substrate.

<4>

The power converter according to any one of <1> to <3> above further includes a first drive circuit to output a driving signal to a third terminal of the first high-side switch.

The first drive circuit, the first high-side switch, and the inductor are arranged in this order next to each other in the direction parallel or substantially parallel to the main surface of the substrate.

<5>

The power converter according to any one of <1> to <4> above further includes a first drive circuit to output a driving signal to a third terminal of the first high-side switch.

The first capacitor, the first high-side switch, and the first low-side switch are arranged in this order next to each other in a first direction parallel or substantially parallel to the main surface of the substrate, and the first drive circuit, the first high-side switch, and the inductor are arranged in this order next to each other in a second direction that is parallel or substantially parallel to the main surface of the substrate and that is perpendicular or substantially perpendicular to the first direction.

<6>

The power converter according to any one of <1> to <5> above further includes a first drive circuit to output a driving signal to a third terminal of the first high-side switch, and a second drive circuit to output a driving signal to a third terminal of the first low-side switch.

In the direction parallel or substantially parallel to the main surface of the substrate, a shortest distance from the first drive circuit to the first high-side switch is equal or substantially equal to a shortest distance from the second drive circuit to the first low-side switch.

<7>

In the power converter according to any one of <1> to <6> above, the substrate includes a first layer and a second layer, the first layer including the first high-side switch, the first low-side switch, the first capacitor, the second high-side switch, the second low-side switch, and the second capacitor that are mounted on the first layer, the second layer being stacked on the first layer.

The first layer includes high-potential wiring and higher-layer low-potential wiring, the high-potential wiring being connected with the first terminal of the first high-side switch and the first terminal of the second high-side switch and defining a portion of the first power line, the higher-layer low-potential wiring being connected with the second terminal of the first low-side switch and the second terminal of the second low-side switch and defining a portion of the second power line.

The second layer includes lower-layer low-potential wiring defining a portion of the second power line.

The higher-layer low-potential wiring is connected to the lower-layer low-potential wiring with a wiring via interposed between the higher-layer low-potential wiring and the lower-layer low-potential wiring, the wiring via extending in the direction perpendicular or substantially perpendicular to the main surface of the substrate.

<8>

In the power converter according to <7> above, the higher-layer low-potential wiring is located between the first current loop and the second current loop.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power converter comprising:
 a substrate;
 a first power line;
 a second power line with an electrical potential lower than an electrical potential of the first power line;
 a first high-side switch including a first terminal connected to the first power line;
 a first low-side switch including a first terminal connected to a second terminal of the first high-side switch and a second terminal connected to the second power line;
 a first capacitor including a first end connected to the first terminal of the first high-side switch and a second end connected to the second power line;
 a second high-side switch that includes a first terminal connected to the first power line and that is parallel or substantially parallel to the first high-side switch;
 a second low-side switch including a first terminal connected to a second terminal of the second high-side switch and a second terminal connected to the second power line;
 a second capacitor including a first end connected to the first terminal of the second high-side switch and a second end connected to the second power line;
 an inductor including a first end connected to the second terminal of the first high-side switch and the second terminal of the second high-side switch;
 an output capacitor including a first end connected to a second end of the inductor and a second end connected to the second power line;
 a first current loop including the first capacitor, the first high-side switch, and the first low-side switch; and
 a second current loop including the second capacitor, the second high-side switch, and the second low-side switch; wherein
 in a plan view in a direction perpendicular or substantially perpendicular to a main surface of the substrate, the first power line or the second power line is located between the first current loop and the second current loop, and a direction of current flowing through the first current loop is opposite to a direction of current flowing through the second current loop.

2. The power converter according to claim 1, wherein
 the substrate includes an unwired area without any wiring; and
 in the plan view in the direction perpendicular or substantially perpendicular to the main surface of the substrate, the unwired area is located between the first current loop and the second current loop.

3. The power converter according to claim 1, wherein the first capacitor, the first high-side switch, and the first low-side switch are arranged in this order next to each other in a direction parallel or substantially parallel to the main surface of the substrate.

4. The power converter according to claim 1, further comprising:
 a first drive circuit to output a driving signal to a third terminal of the first high-side switch; wherein
 the first drive circuit, the first high-side switch, and the inductor are arranged in this order next to each other in a direction parallel or substantially parallel to the main surface of the substrate.

5. The power converter according to claim 1, further comprising:
 a first drive circuit to output a driving signal to a third terminal of the first high-side switch; wherein
 the first capacitor, the first high-side switch, and the first low-side switch are arranged in this order next to each other in a first direction parallel or substantially parallel to the main surface of the substrate; and
 the first drive circuit, the first high-side switch, and the inductor are arranged in this order next to each other in a second direction that is parallel or substantially parallel to the main surface of the substrate and that is perpendicular or substantially perpendicular to the first direction.

6. The power converter according to claim 1, further comprising:
 a first drive circuit to output a driving signal to a third terminal of the first high-side switch; and
 a second drive circuit to output a driving signal to a third terminal of the first low-side switch; wherein
 in a direction parallel or substantially parallel to the main surface of the substrate, a shortest distance from the first drive circuit to the first high-side switch is equal or substantially equal to a shortest distance from the second drive circuit to the first low-side switch.

7. The power converter according to claim 1, wherein
 the substrate includes a first layer and a second layer, the first layer including the first high-side switch, the first low-side switch, the first capacitor, the second high-side switch, the second low-side switch, and the second capacitor that are mounted on the first layer, the second layer being stacked on the first layer;
 the first layer includes high-potential wiring and higher-layer low-potential wiring, the high-potential wiring being connected with the first terminal of the first high-side switch and the first terminal of the second high-side switch and defining a portion of the first power line, the higher-layer low-potential wiring being connected with the second terminal of the first low-side switch and the second terminal of the second low-side switch and defining a portion of the second power line;
 the second layer includes lower-layer low-potential wiring defining a portion of the second power line; and
 the higher-layer low-potential wiring is connected to the lower-layer low-potential wiring with a wiring via interposed between the higher-layer low-potential wiring and the lower-layer low-potential wiring, the wiring via extending in the direction perpendicular or substantially perpendicular to the main surface of the substrate.

8. The power converter according to claim 7, wherein the higher-layer low-potential wiring is located between the first current loop and the second current loop.

9. The power converter according to claim 1, wherein each of the first high-side switch, the first low-side switch, the second high-side switch, and the second low-side switch is a metal oxide silicon field effect transistor.

10. The power converter according to claim 1, further comprising a first fuse and a second fuse.

11. The power converter according to claim 1, wherein each of the first capacitor and the second capacitor is a snubber capacitor.

12. The power converter according to claim 1, further comprising:
a first drive circuit connected to the first high-side switch;
a second drive circuit connected to the first low-side switch;
a third drive circuit connected to the second high-side switch; and
a fourth drive circuit connected to the second low-side switch.

13. The power converter according to claim 12, wherein each of the first drive circuit, the second drive circuit, the third drive circuit, and the fourth drive circuit is operable to output a pulse width modulation signal.

14. The power converter according to claim 12, wherein the first drive circuit, the second drive circuit, the third drive circuit, and the fourth drive circuit are operable such that an ON and OFF timing of signals output by the first drive circuit and the third drive circuit is the same, and such that an ON and OFF timing of signals output by the second drive circuit and the fourth drive circuit is the same.

15. The power converter according to claim 1, further comprising a low-potential wiring separating the first current loop and the second current loop.

16. The power converter according to claim 15, wherein the low-potential wiring is included in the second power line.

17. The power converter according to claim 15, wherein the low-potential wiring is grounded.

18. The power converter according to claim 1, wherein a path length of the first current loop is equal or substantially equal to a path length of the second current loop.

19. The power converter according to claim 1, wherein
a drain terminal of the first high-side switch is connected to the first power line without any element interposed therebetween; and
a drain terminal of the second high-side switch is connected to the second power line without any element interposed therebetween.

20. The power converter according to claim 1, wherein
the first layer includes a first low-potential wiring to which the first low-side switch is connected and includes a second low-potential wiring to which the second low-side switch is connected; and
the first and second low-potential wirings are spaced away from each other.

* * * * *